United States Patent [19]
Sandolo

[11] Patent Number: 5,690,283
[45] Date of Patent: Nov. 25, 1997

[54] COFFEE BLENDING AND FLAVORING APPARATUS

[76] Inventor: Raffael Sandolo, 226 Thayer Pon Rd., Wilton, Conn. 06897

[21] Appl. No.: 775,291

[22] Filed: Dec. 31, 1996

Related U.S. Application Data

[63] Continuation-in-part of Ser. No. 630,357, Apr. 10, 1996, Pat. No. 5,632,449, which is a continuation-in-part of Ser. No. 437,176, May 8, 1995, Pat. No. 5,603,458.

[51] Int. Cl.$^6$ ............................................. B02C 19/12
[52] U.S. Cl. ..................... 241/34; 241/36; 241/38; 241/100; 241/101.6
[58] Field of Search ........................ 241/34, 36, 38, 241/100, 101.6, 101.8

[56] References Cited

U.S. PATENT DOCUMENTS

| | | | |
|---|---|---|---|
| 3,182,919 | 5/1965 | Geerlings | 241/101.6 |
| 4,971,259 | 11/1990 | Nidiffer | 241/34 |
| 5,277,869 | 1/1994 | Glazer et al. | 241/606 X |
| 5,280,859 | 1/1994 | Rust et al. | 241/101.6 |
| 5,458,295 | 10/1995 | Haber et al. | 241/100 |
| 5,462,236 | 10/1995 | Knepler | 241/34 |
| 5,522,556 | 6/1996 | Knepler et al. | 241/34 |
| 5,603,458 | 2/1997 | Sandolo | 241/34 |

Primary Examiner—John M. Husar
Attorney, Agent, or Firm—Fattibene and Fattibene; Arthur T. Fattibene; Paul A. Fattibene

[57] ABSTRACT

A coffee blending apparatus for automatically custom blending two or more different types of coffee beans with or without added flavoring to an individual's personalized blend and/or flavor. The apparatus includes a plurality of supply hoppers, each containing a particular type of coffee bean, each hopper having a controlled discharge opening from which the coffee beans are selectively discharged in predetermined amounts onto a weighing apparatus or scale for weighing. The selected coffee beans forming the desired blend are then mixed to form a homogeneous blend of coffee beans and from where the blended beans are directed to either a grinding station or bagging station as an unflavored blend, or to a flavoring station wherein the homogeneously blended coffee beans are mixed with a desired flavoring ingredient. In one form of the invention, a scale having a discharge opening is interposed between the supply hoppers and the mixer where the coffee beans are blended. In another form of the invention, the mixer also functions as the scale for weighing the blended coffee beans. In either embodiment, the apparatus is controlled by a central processing unit (CPU) for controlling and sequencing the operation of the apparatus, whereby an individual customer may automatically customize his or her own personal coffee blend, with or without added flavoring.

14 Claims, 3 Drawing Sheets

5,690,283

COFFEE BLENDING AND FLAVORING APPARATUS

RELATED APPLICATIONS

This is a continuation-in-part application of my application Ser. No. 08/630,357 filed Apr. 10, 1996, now U.S. Pat. No. 5,632,449 for Customized Coffee Blending Apparatus, which is a continuation-in-part application of application Ser. No. 08/437,176 filed May 8, 1995, now U.S. Pat. No. 6,603,458 entitled Blending Apparatus and Method.

FIELD OF INVENTION

This invention is directed to a coffee blending apparatus and more specifically to a coffee blending apparatus whereby the individual end purchaser may custom blend two or more different types of coffees to suit the end purchaser's individual taste and including the option of custom flavoring the selected blend with a selectable flavoring ingredient.

BACKGROUND OF THE INVENTION

Drinking of coffee has, for a long time, been a popular beverage for many people, and which popularity is steading increasing. Coffee is grown in many parts of the world, and each such coffee produced in the various world coffee raising regions has its own particular taste, flavor and smell. Such coffees have over time been combined or blended by the major coffee manufacturers and coffee roasters into commercial blends. Such blends that are marketed by the major coffee manufacturers are predetermined by the mass producer of such coffee. In view of the increasing popularity of coffee, many coffee drinkers have developed the desire for tastes and blends that are not generally commercially available as a result of the many gourmet type coffee houses that have recently come into existence. The springing up of so many gourmet type coffee houses has created a demand whereby the coffee drinkers now desire to individually customize their special coffee blends at the point of purchase.

SUMMARY OF THE INVENTION

An object of this invention is to provide an apparatus whereby the individual may formulate his or her own customized blend selected from several different coffees at the point of purchase and having the option to flavor the custom blend with a suitable flavor.

Another object is to provide an apparatus in which the beans of one or more different types of coffee beans can be blended and favored with a selectable flavoring ingredient in a selectable automatic manner.

Another object is to provide a coffee blending apparatus whereby the blending and the form in which the final blend is dispensed is determined by the individual purchaser.

It is another object to provide a coffee blending apparatus having a flavoring station for imparting a desired flavor to the blended coffee at the option of the individual purchaser.

The foregoing objects and other features and advantages, as will be apparent, are attained by a coffee blending apparatus that has a plurality of supply hoppers, each such hopper being adapted to contain a supply of coffee beans of a different type, as may be grown in the various coffee producing regions, each having its own particular taste and/or aroma. Each hopper is provided with a discharge opening controlled by a valve, automatically actuated to control the amount of coffee beans dispensed therefrom. In one form of the invention, the discharge opening, controlled by a valve, directs the coffee beans to a scale which weighs the amount of coffee beans discharged thereon. The scale is provided with a discharge opening controlled by a scale valve which is actuated to discharge the coffee beans after weighing into a mixing receptacle having a mixer to mix the various coffee beans to form a uniform mixture of the various coffee beans after weighing. The mixer includes a rotary arm and paddle for directing the uniform or homogeneous mixed beans to either a grinding station, a bagging station or a flavoring station in which a selectable flavoring ingredient may be added to the mixed coffee bean blend.

The flavoring station includes a mixing hopper having an agitator for mixing the coffee bean blend as the flavoring ingredient is added thereto. The selected flavoring material is contained in a suitable reservoir whereby the flavoring ingredient is pumped to the flavoring station where it is mixed with the blended coffee beans. From the flavoring station, the flavored blended coffee beans are directed to a bagging station or packaging receptacle. The entire operation of the apparatus, including the selection of the beans, the weighing of the blended coffee beans, packaging, grinding and/or flavoring of the blended beans, is controlled by a central process unit (CPU) which is programmed to effect the selected command input of the individual consumer. The CPU may also include a memory to form a database of all customers utilizing the blending and flavoring apparatus, whereby a given customer may repeatedly reformulate his or her preferred blend by inputting an appropriate personal code into the CPU.

In another form of the invention, the weighing and mixing of the various selected coffee beans, upon discharge from their respective supply hoppers, is simultaneously effected. This is attained by supporting the mixing means in a manner whereby it also functions as a scale to weigh the coffee beans discharged thereinto.

IN THE DRAWINGS

DETAILED DESCRIPTION

As this disclosure is a continuation-in-part application of my co-pending applications hereinabove identified, the disclosures of said co-pending applications, Ser. No. 08/630,357 filed Apr. 10, 1996 and Ser. No. 08/437,176 filed May 8, 1995, are respectively incorporated herein by reference as fully as disclosed therein.

Figure 1:
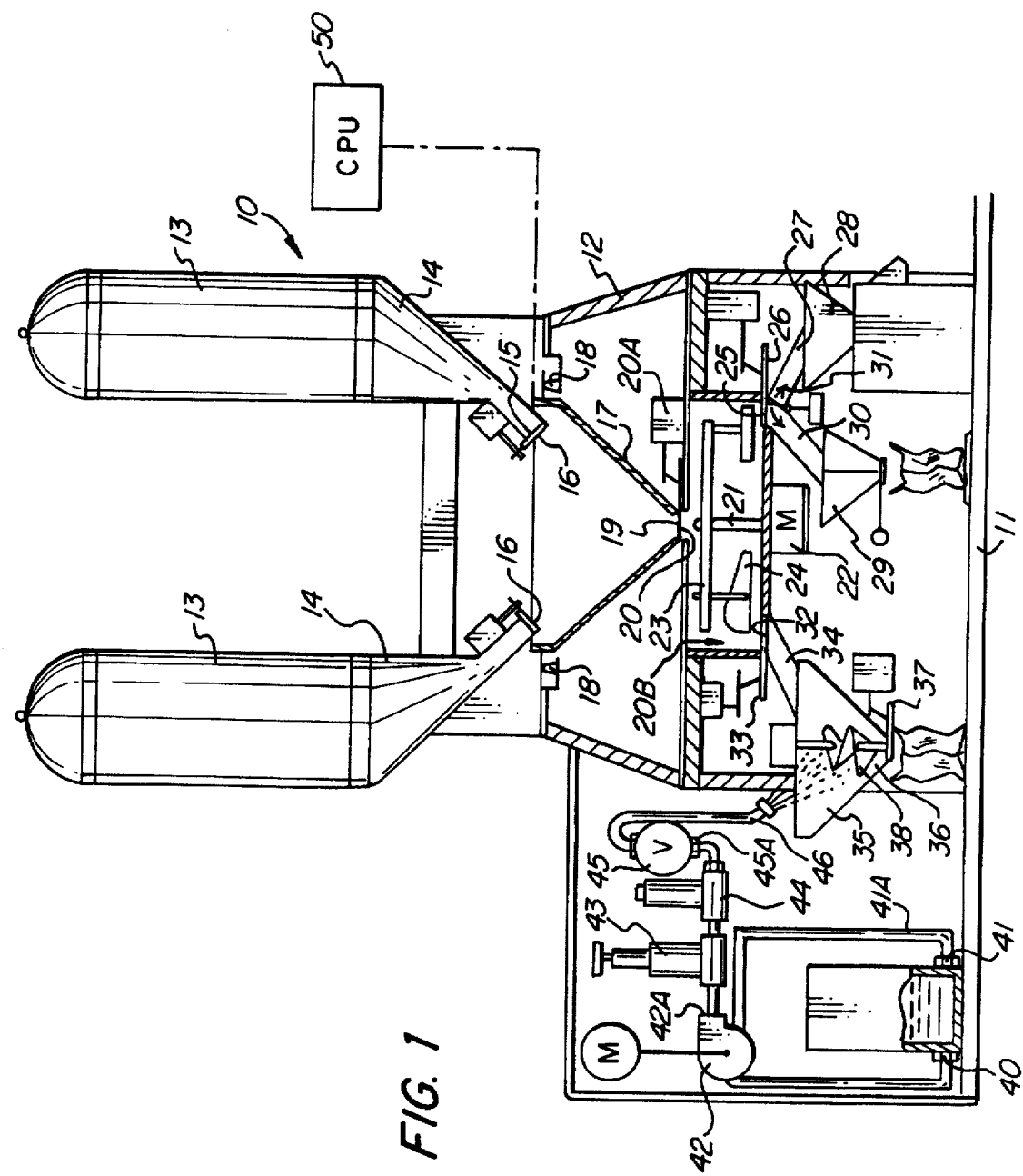
FIG. 1 is a side elevation view of the coffee blending and flavoring apparatus embodying the invention.
Figure 2:
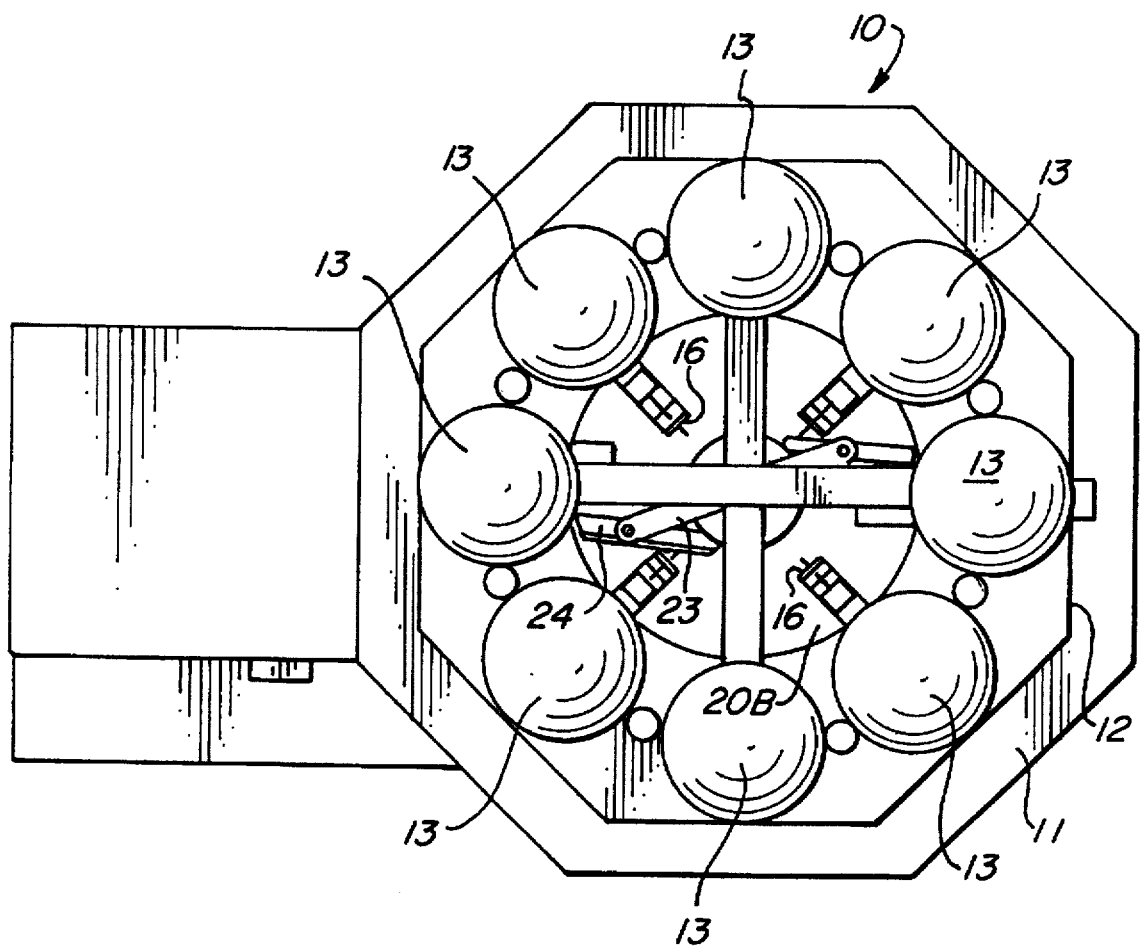
FIG. 2 is a top plan view of FIG. 1.

Referring to the drawings attached hereto, there is illustrated in FIGS. 1 and 2 an embodiment of a coffee blending and flavoring apparatus 10 embodying the present invention. The apparatus 10 includes a base or stand 11 for the frame or superstructure 12 that support a plurality of supply hoppers 13. As best seen in FIG. 2, eight supply hoppers 13 are disposed in a circular fashion. While eight supply hoppers 13 are shown, it will be understood that the number of supply hoppers 13 is not critical and may vary in number, depending upon how many different types of coffees one desires to be made available for blending. Obviously, the greater number of supply hoppers, the more varied are the possible blend combinations.

Each supply hopper 13 is adapted to receive a different type of coffee. The bottom of each supply hopper 13 is formed as a chute 14 terminating at a discharge opening 15 controlled by a solenoid controlled valve 16.

Disposed below the discharge openings 15 of the respective chutes 14 is a hopper scale 17. The hopper scale 17 is supported on appropriate strain gauges 18 which will accurately indicate the weight of the coffee beans discharged from the respective discharge openings 15. The bottom of the hopper scale 17 is provided with a discharge opening 19 controlled by a scale valve 20. It will be understood that the scale valve 20 is electrically operated between an opened and closed position by a solenoid 20A.

Supported below the scale discharge opening 19 is a receptacle 20B for receiving the mixture of coffee beans upon the valving of the scale discharge opening 19 to its open position. Rotatably disposed within the receptacle 20B is a rotating spindle 21 actuated by a drive motor 22. Connected to the top of the spindle 21 to rotate therewith is an arm 23. Connected to and depending downwardly from the arm 23, adjacent an end portion thereof, is a paddle 24. The paddle 24 functions to thoroughly mix the various coffee beans to form a homogeneous blend and to direct the homogeneous mix or blend to a discharge port 25 which is controlled by a slide valve 26.

Disposed in communication with the discharge port 25 is a conduit 27 for directing the blended coffee beans either to a grinder 28 where the blended beans are ground or to a bagging station 29 where the coffee beans may be bagged. A bypass conduit 30 is connected with conduit 27. At the intersection between the conduit 27 and the bypass conduit 30 is a control valve 31 which, when actuated, will direct the blended coffee beans either to the grinder 28 or the bagging station 29, depending on whether the customer selects grinding or simply bagging of the blended beans.

In the event that the customer desires to add a flavoring ingredient to the blended coffee beans, the mixing receptacle is provided with a second port 32. Controlling the opening and closing of the second port 32 is a second slide or flapper type valve 33. A discharge conduit or chute 34 is disposed in communication with the second discharge port 32. The arrangement is such that when the second port 32 is valved to the open position, and with the discharge port 25 closed, the rotating paddle 24 will direct the blended coffee beans through the open port 32 whereby the chute 34 directs the coffee beans to the flavoring hopper 35. The flavoring hopper is provided with a bottom opening 36 which is valved by a hopper opening valve 37.

Disposed within the flavoring hopper 35 is an agitator 38 in the form of a rotating screw which is motor driven to mix the coffee beans with a selected flavoring ingredient, e.g. vanilla, chocolate, hazelnut, Kaluaha or cherry flavor or the like and/or any combination thereof.

The means for ejecting the selected flavoring ingredient into the flavoring hopper 35, to be mixed with the blended coffee beans therein, comprises a plurality of reservoirs 39, each containing a supply of a different flavoring ingredient. Each such reservoir 39 is provided with an outlet 40 and an inlet 41. Connected in communication with the outlet 40 and inlet 41 is a circulation pump 42. The outlet 42A of the pump 42 is connected through a pressure regulator 43 and a filter 44 to the inlet 45A of a solenoid valve 45. The outlet of the solenoid valve 45 is connected to a delivering conduit 46 for delivering the flavoring ingredient to the flavoring hopper 35 where the desired flavoring ingredient is mixed with the coffee beans therein. The arrangement is such that pump 42, when actuated, will pump the flavoring ingredient as required from the reservoir 39, from outlet 40, through the pressure regulator 43 and filter 44, to the solenoid valve 45, where the flavoring ingredient is metered for delivery to the flavoring hopper 35, where the flavoring ingredient is mixed with the coffee beans to impart the flavor thereto. Any excess flavoring ingredient passing through the pump 42 is recirculated back to the reservoir through conduit 41A connected to inlet conduit 41.

While only one such reservoir means 39 is illustrated, it will be understood that the described reservoir and circulating means therefor is provided for each flavor. It will be understood that a flavor distributing conduit such as conduit 46 together with its respective circulating system and reservoir as herein described is provided for each flavor.

The apparatus described is controlled by a central process unit 50 (CPU) programmed to control or sequence the actuation of the control valves and solenoids described in accordance to a predetermined sequence selected by the individual consumer to effect a customized blend. In operation, the individual customer will make his or her selection of the specific coffee beans desired for making up the individualized coffee blend and/or flavor by making the proper selection on the key pad of the CPU 50. The customer also inputs the percentages by weight of each selected coffee. Upon the customer's inputting the desired information for effecting the desired coffee blend, with or without flavoring required for customizing a given coffee blend, the valves 15 controlling the discharge openings of the selected coffee hoppers 13 are actuated allowing the selected amount of coffee beans to be discharged into the scale hopper for weighing. Upon weighing, the scale valve 20 is actuated for directing the weighed coffee blend to the mixing receptacle 20. After mixing, the appropriate valve controlling the desired port opening 25 or 32 is actuated, depending upon whether the customer selected a flavored blend or a non-flavored blend. If the customer selected a non-flavored blend, the control valve 31 is actuated to direct the non-blended coffee beans either to a grinder 28 or a bagging station 29 where the coffee beans are bagged depending upon the selection made by the consumer.

If the customer selected a flavored blend, the paddle 24 directs the blended coffee beans through port 32 controlled by valve 33 to the flavoring hopper. Depending upon the particular flavors selected by the customer, the appropriate pump 42 and associated solenoid valve 45 is actuated to inject the selected flavoring ingredient into the flavoring hopper 35 where the flavoring ingredient is mixed with the blended coffee beans. After mixing, the flavored blended coffee beans are then discharged to a suitable station for bagging.

From the foregoing, it will be apparent that each customer can simply customize his or her favorite coffee blend, with or without the added flavoring, in a simple and expedient manner simply by inputting the requisite information into the CPU which is programmed to sequentially actuated the described controls to effect the desired blend. The CPU program may also include a memory to form a database of all the customers utilizing the described apparatus so that a given customer may repeatedly formulate his or her favorite blend simply by inputting his or her appropriate personal code into the CPU.

Figure 3:
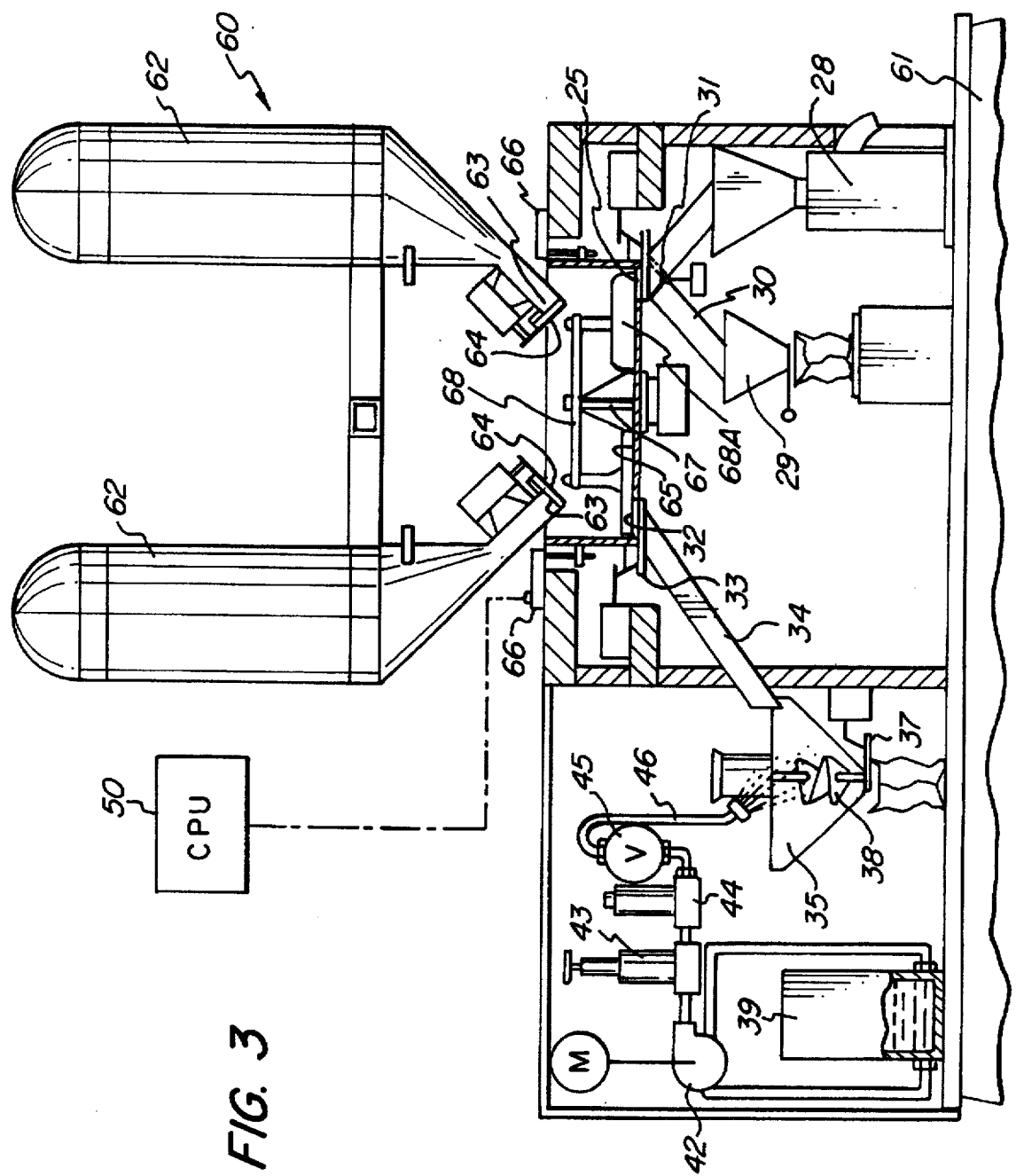
FIG. 3 is a side elevation view of a modified form of the invention.

FIG. 3 illustrates a modified embodiment of the invention. This form of the invention is similar to that described with respect to FIGS. 1 and 2, with the exception that in this form of the invention the means for weighing is combined with the mixing receptacle.

As shown in FIG. 3, the coffee blending and flavoring apparatus 60 includes a base or stand 61 for supporting thereon a plurality of coffee bean supply hoppers 62 similar to that hereinbefore described. Each hopper 62 has a discharge opening 63 controlled by a control valve 64. Disposed below the discharge openings 63 of the respective hoppers 62 is a mixing receptacle 65 which is suspendedly supported on suitable strain gauge 66, whereby the receptacle 65 functions as a scale to weigh the coffee beans discharged thereinto. Disposed within the receptacle 65 is a rotating spindle 67 having a connected arm 68 and paddle 68A similar to that described in FIG. 1. In all other respects, the apparatus of FIG. 3 is similar to that described with respect to FIGS. 1 and 2.

In the form of the invention illustrated in FIG. 3, the mixing receptacle 65, in addition to mixing the beans discharged therein and directing the blended beans to the selected port opening as hereinbefore described, also functions as a scale to weigh the beans. In all other respects, the structure and operation of FIG. 3 is similar to that described in FIGS. 1 and 2.

While the present invention has been described with respect to the described embodiments, modifications and variations may be made without departing from the spirit or scope of this invention.

What is claimed is:

1. An apparatus for personalizing and custom blending of different types of coffees comprising:
   a plurality of supply hoppers, each defining a supply source for a different coffee;
   each hopper having a controlled discharge opening;
   weighing means disposed adjacent said controlled discharge openings of each hopper for receiving the respective coffees discharged therefrom;
   means for mixing the weighed coffee to form a homogeneous blend of said coffees;
   a bagging station and a grinding station operatively connected to said mixing means;
   said mixing means directing the homogeneous blended coffee to one of said stations; and
   a central processing unit programmed to sequence the actuation of said controlled discharge openings for controlling the type and amount of coffee discharged from said respective supply hoppers that are weighed and mixed in accordance with a predetermined program.

2. An apparatus for personalizing and custom blending of different types of coffees as defined in claim 1 and including:
   a flavoring station operatively connected to said mixing means.

3. An apparatus for personalizing and custom blending of different types of coffees as defined in claim 2 wherein said flavoring station includes:
   a flavoring hopper;
   an agitator disposed within said flavoring hopper;
   and means for introducing a flavoring ingredient to be mixed with the blended coffees received in said flavoring hopper.

4. An apparatus for personalizing and custom blending of different types of coffees as defined in claim 3 wherein said last mentioned means includes:
   a reservoir for containing a supply of flavoring ingredient;
   a circulating means for circulating said flavoring ingredient from said reservoir to said flavoring hopper;
   and said central processing unit being programmed to activate said circulating means in accordance with a predetermined program.

5. An apparatus for personalizing and custom blending of different types of coffees as defined in claim 3 wherein said last mentioned means includes:
   a plurality of reservoirs, each of said reservoirs adapted to contain a supply of flavoring ingredient of a different flavor,
   a circulating means connecting each of said reservoirs in communication to said flavoring hopper;
   and said central processing unit being programmed to selectively activate said circulating means connecting the corresponding reservoir to said flavoring hopper.

6. An apparatus for personalizing and custom blending of different types of coffees as defined in claim 1 wherein said weighing means includes:
   a scale hopper having a scale opening;
   a scale valve for valving said scale opening between an open and closed position;
   said scale being disposed for receiving the coffees discharged from each of said supply hoppers.

7. An apparatus for personalizing and custom blending of different types of coffees as defined in claim 6 and including:
   a mixing receptacle for receiving the weighed coffees from said scale hopper; a spindle rotatably mounted in said mixing receptacle; a paddle rotatably connected to said spindle whereby said paddle rotates as said spindle rotates;
   said mixing receptacle having a plurality of port openings;
   a control valve for controlling the opening and closing of each of said port openings;
   said paddle directing the coffee being mixed in said mixing receptacle to an opened port opening.

8. An apparatus for personalizing and custom blending of different types of coffees as defined in claim 7 and including:
   a flavoring station operatively connected to said mixing receptacle.

9. An apparatus for personalizing and custom blending of different types of coffees as defined in claim 8 wherein said flavoring station includes:
   a flavoring hopper;
   a plurality of reservoirs, each of said reservoirs adapted to contain a supply of a different flavoring ingredient;
   a circulating means connecting each of said reservoirs to said flavoring hopper for directing a selected flavoring ingredient to said flavoring hopper;
   and an agitator in said flavoring hopper for mixing the flavoring ingredient directed to said flavoring hopper with the blended coffees therein.

10. An apparatus for personalizing and custom blending of different types of coffees comprising:
    a plurality of supply hoppers, each defining a supply source for a different coffee;
    each of said hoppers having a controlled discharge opening;
    a mixing receptacle disposed adjacent said hopper discharge opening for receiving the coffee discharged therefrom;
    said mixing receptacle including weighing means for weighing the amount of coffee disposed therein;
    means for mixing the coffee in said mixing receptacle;
    a bagging station and a mixing station operatively connected to said mixing receptacle;
    said mixing receptacle having a controlled outlet in communication with said bagging station and grinding station;

a valve member associated with said outlet for directing the coffees to either said bagging station or grinding station;

and said mixing means directing the mixed coffees to said outlet;

and a central processing unit programmed to sequence the actuation of said controlled discharge openings for controlling the type and amount of coffee discharged from said respective supply hoppers and for weighing and directing the blended coffee to either said bagging station or grinding station in accordance with a predetermined program.

11. The apparatus as defined in claim 10 and including:

a flavoring station operatively connected to said mixing means.

12. An apparatus for personalizing and custom blending of different types of coffees as defined in claim 11 wherein said flavoring station includes:

a flavoring hopper;

an agitator disposed within said flavoring hopper;

and means for introducing a flavoring ingredient to be mixed with the blended coffees received in said flavoring hopper.

13. An apparatus for personalizing and custom blending of different types of coffees as defined in claim 12 wherein said last mentioned means includes:

a reservoir for containing a supply of flavoring ingredient;

a circulating means for circulating said flavoring ingredient from said reservoir to said flavoring hopper;

and said central processing unit being programmed to activate said circulating means in accordance with a predetermined program.

14. An apparatus for personalizing and custom blending of different types of coffees as defined in claim 11 wherein said last mentioned means includes:

a plurality of reservoirs, each of said reservoirs adapted to contain a supply of flavoring ingredient of a different flavor, a circulating means connecting each of said reservoirs in communication to said flavoring hopper;

and said central processing unit being programmed to selectively activate said circulating means connecting the corresponding reservoir to said flavoring hopper.

* * * * *